Feb. 2, 1932. H. SHAW ET AL 1,843,342
TORSION BALANCE AND THE LIKE
Filed June 30, 1927  2 Sheets-Sheet 1

Inventors:
Herman Shaw.
Ernest Lancaster Jones
By H. D. Penney

Feb. 2, 1932.   H. SHAW ET AL   1,843,342
TORSION BALANCE AND THE LIKE
Filed June 30, 1927    2 Sheets-Sheet 2

INVENTORS
Herman Shaw
Ernest Lancaster Jones
BY Harold D. Penney   ATTORNEY

Patented Feb. 2, 1932

1,843,342

UNITED STATES PATENT OFFICE

HERMAN SHAW, OF LONDON, AND ERNEST LANCASTER JONES, OF BERKSHIRE, ENGLAND, ASSIGNORS TO GEOPHYSICAL RESEARCH CORPORATION, OF NEW YORK, N. Y., A CORPORATION OF NEW JERSEY

TORSION BALANCE AND THE LIKE

Application filed June 30, 1927, Serial No. 202,671, and in Great Britain July 2, 1926.

This invention relates to improvements in torsion balances employed in the investigation of gravitational fields of force, in which the effect of the field upon a suspended system is balanced by the torsion of the suspension wire, the information thus obtained serving to calculate the magnitudes which specify the field of force in the locality.

The invention relates more particularly but not exclusively to improvements in the design and arrangement of torsion balances of the type in which one portion of the suspended system is maintained at a definite vertical distance above or below other portions of that system, such for example as in balances of the Eotvos and similar types.

The invention further relates to improved arrangements in the distribution of the essential parts of any such suspended system, and to the improved arrangement and simultaneous operation of one or more such systems, forming a complete instrument.

The object of the invention is to provide means whereby the necessary observations, enabling certain of the magnitudes—which specify the field of force—to be determined, may be obtained by fewer settings of the instrument than has hitherto been possible. By a setting of the instrument is meant the fixing of the rotatable portion of the instrument in a given orientation for such a time as is necessary to enable the equilibrium positions of the suspended system or systems in that orientation to be observed, recorded, or otherwise ascertained.

For purposes of convenience, the invention is described below with special reference to a particular type of instrument known as the Eotvos torsion balance, which may be used in the investigation of the earth's gravitational field, but it is to be understood that the invention is also applicable to analogous torsion balances which may be employed for the purpose of examining gravitational fields of force, and in which the masses are differently arranged from those in the Eotvos balance.

In the drawings forming part of this application:

A gravity torsion balance consists essentially of a system of mass elements, a typical one of which comprises a plurality of units, each of which can be denoted by the symbol $dm$, all of said units being interconnected so as to preserve fixed relative positions one with another, and in effect to behave as a "rigid" body in the ordinary dynamical sense of the term "rigid"; the body is suspended by means of a thin torsion wire, and thus supported in the earth's field of gravitation. When it is in equilibrium the centre of gravity of the body will naturally lie in the axis of suspension, and this axis will be vertical.

Such a suspended mass system, or body, under the action of the gravitational field, will be balanced in the ordinary sense of the word, but, owing to the slight variations in the magnitude and direction of the intensity of the field at various points of the body, the latter usually experiences a torque or turning moment about the axis of suspension, which torque is resisted by the elasticity or rigidity of the suspension wire, so that equilibrium ensues by the balancing of the two twisting forces. If the azimuth of the body is varied, i. e. it is differently oriented horizontally, the gravitational torque varies, and therefore the angle of twist of the suspension wire varies. This angle of twist for any orientation of the body can be measured by means of a mirror attached to the body and a scale attached to the rigid casing from which the body is suspended.

In determining the equation of equilibrium of the system in the gravitational field of force, it is assumed that the potential function $\bar{U}$ of gravity, and its first derivatives $$\frac{\delta \bar{U}}{\delta x}, \frac{\delta \bar{U}}{\delta y}, \frac{\delta \bar{U}}{\delta z}$$

and second derivatives $$\frac{\delta^2 \bar{U}}{\delta x^2}, \frac{\delta^2 \bar{U}}{\delta y^2}, \frac{\delta^2 \bar{U}}{\delta z^2}, \frac{\delta^2 \bar{U}}{\delta y \delta x}, \frac{\delta^2 \bar{U}}{\delta y \delta z}, \frac{\delta^2 \bar{U}}{\delta x \delta z}$$

referred to any orthogonal system of axes, are uniform in the region occupied by the suspended body.

Figure 1:
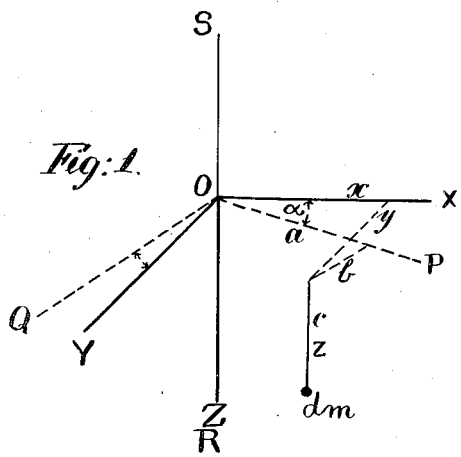
Fig. 1 is a diagrammatic view illustrating the principle of the invention.

On this understanding, if in Fig. 1 $o$ denotes the position of the centre of gravity of the suspended body, and OX, OY and OZ are a set of rectangular axes, fixed in space, such that OZ is vertically downwards and OX, OY horizontal, it can be shown that the turning moment $Fm$ about OZ due to the gravitational field acting on an element of mass $dm$ at the position $(x, y, z)$ of the suspended body is given by the equation $$Fm = \bar{U}_{xy}\alpha m(x^2 - y^2) + (\bar{U}_{yy} - \bar{U}_{xx})\alpha mxy + \bar{U}_{yz}\alpha mxz - \bar{U}_{xz}\alpha myz$$

where $$\bar{U}_{xx}, \bar{U}_{yz}, \bar{U}_{xx},$$

etc. are the values of $$\frac{\delta^2 \bar{U}}{\delta x \delta z}, \frac{\delta^2 \bar{U}}{\delta y \delta z}, \frac{\delta^2 \bar{U}}{\delta x^2}$$

etc. at the origin $o$.

If now we take rectangular axes OP, OQ, OR fixed in the suspended body and so that OR coincides with OZ, whilst OP makes an angle $\alpha$ with OX in the sense from OX towards OY: and if $(a, b, c)$ denote the coordinates of the element $\alpha m$ referred to the new axes respectively we have $x = a \cos \alpha - b \sin \alpha$
$y = a \sin \alpha + b \cos \alpha$
$z = c$ and if F denotes the total torque about OZ or OR due to the gravitational effects on every element of the suspended body, we have $$F = (\bar{U}_{yy} - \bar{U}_{xx})\left\{\frac{\sin 2\alpha}{2}\int(a^2 - b^2)\alpha m + \cos 2\alpha \int ab\alpha m\right\} + \bar{U}_{xy}\{\cos 2\alpha \int(a^2 - b^2)\alpha m - 2 \sin 2\alpha \int ab\alpha m\} + \bar{U}_{yz}\{\cos \alpha \int ac\alpha m - \sin \alpha \int bc\alpha m\} - \bar{U}_{xz}\{\sin \alpha \int ac\alpha m + \cos \alpha \int bc\alpha m\}$$

where the integrals are taken throughout the suspended mass system.

According to the usual dynamical nomenclature, we shall refer to the moments and products of inertia of the suspended mass system with reference to the axes OP, OQ, OR fixed in it with the following abbreviations.

A = Moment of inertia about OP =
$\int(b^2 + c^2)\alpha m$

B = Moment of inertia about OQ =
$\int(a^2 + c^2)\alpha m$

C = Moment of inertia about OR =
$\int(a^2 + b^2)\alpha m$

F = Product of inertia about OQ, OR =
$\int bc\alpha m$

G = Product of inertia about OP, OR =
$\int ac\alpha m$

H = Product of inertia about OP, OQ =
$\int ab\alpha m$ and it is evident that $\int(a^2 - b^2)\alpha m = \int\{(a^2 + c^2) - (b^2 + c^2)\}\alpha m = B - A.$ so that we have (1) $F = (\bar{U}_{yy} - \bar{U}_{xx})\left\{\frac{B-A}{2}\sin 2\alpha + H \cos 2\alpha\right\} + 2\bar{U}_{xy}\left\{\frac{B-A}{2}\cos 2\alpha - H \sin 2\alpha\right\} + \bar{U}_{yz}(G \cos \alpha - F \sin \alpha) - \bar{U}_{xz}(G \sin \alpha + F \cos \alpha)$ In which it is evident that $\bar{U}_{xx}, \bar{U}_{xz}, \bar{U}_{xy}$, etc., depend only on the position of O, whilst A, B, C, F, G, H, depend only on the shape, size and distribution of mass in the body, whilst $\sin \alpha$, $\cos \alpha$, etc., depend on the angle $\alpha$ which specifies the orientation of the body relative to the axes fixed in space. This orientation can be varied at will, and the corresponding torque $F\alpha$ determined. By this means the four quantities $(\bar{U}_{yy} - \bar{U}_{xx})$, $\bar{U}_{xy}$, $\bar{U}_{xz}$, and $\bar{U}_{yz}$ are measured. The quantities A, B, C, F, G, H, which specify the body "dynamically" can naturally be varied according to the design of the suspended system, and once selected, determine the form of the instrument.

As our invention relates to modifications in the arrangement of the suspended system whereby the values of A, B, C, etc., are different from those normally employed, we shall first define the normal arrangement, which in effect constitutes the Eotvos balance.

In the system designed by Eotvos, the following arrangement was adopted.

The system was made symmetrical about the plane QOR as a consequence of which, the products of inertia F and H vanish. Consequently the equation became (2) $F\alpha = \dfrac{B-A}{2}\{(\bar{U}_{yy}\bar{U}_{xx})\sin 2\alpha + 2\bar{U}_{xy}\cos 2\alpha\} + G\{\bar{U}_{yz}\cos \alpha - \bar{U}_{xz}\sin \alpha\}$ Furthermore the suspended mass was concentrated in or very near to the plane of symmetry QOR, so that all the coordinates "$b$" became very small compared with the coordinates $(a, c)$.

Hence, to all intents and purposes, for the Eotvos system $A = \int c^2 \alpha m$
$B = \int (a^2 + c^2) \alpha m$
$C = \int a^2 \alpha m = B - A$
$F = 0$
$G = \int ac\alpha m$
$H = 0$ That these are the recognized characteristics of the Eotvos gravity balance is proved by the original description in Annalen der Physik und Chemie band 59, 1896, pages 354 to 400, and the description in Glazebrooke's Dictionary of Applied Physics volume 3, pages 404 to 405 where it is assumed that the coefficient referred to as $(B-A)$ above is equivalent to the moment of inertia about the suspension axis, i. e. what we have called C, which is not true save on the supposition that all the terms "$b^2$" are negligible.

Moreover this arrangement of the suspended system has been substantially preserved in all subsequent improved balances of the Eotvos type.

Now, from the general Equation (1) it is evident that, if a suitable arrangement of the suspended masses can be found to make the two quantities $(B-A)$ and H both zero, the equation will reduce to the following (3) $F\alpha = \bar{U}_{yz}(G\cos \alpha - F\sin \alpha) - \bar{U}_{xz}(G\sin \alpha + F\cos \alpha)$ which serves to measure the quantities $\bar{U}_{xz}$ and $\bar{U}_{yz}$ only, instead of these in addition to the quantities $(\bar{U}_{yy} - \bar{U}_{xx})$ and $\bar{U}_{xy}$ which are necessarily involved in the normal Eotvos balance measurements.

The two former quantities $\bar{U}_{xz}$ and $\bar{U}_{yz}$ are known as the gradients of gravity, and the two latter quantities are known as the curvature magnitudes of gravity.

The object of our invention is to define an arrangement or arrangements of the masses of the suspended system or systems that will in effect possess the property that the quantities $(B-A)$ and H do vanish or become negligible in comparison with the quantities F and G, or with either one of these, since it may be convenient also to make one of these latter also vanish. For example, if the plane QOR in the body is a plane of symmetry the quantity F will vanish as aforementioned.

The advantage of this improved arrangement is that the equation is considerably simplified, and that the gravity gradients can be found by only three settings or orientations of the suspended system, instead of at least four settings, as is necessary in the Eotvos arrangement. Three settings are necessary to determine both the two gradients and the third unknown, namely the position of the suspended system when there is no torque. If however, it is assumed that this "zero" position is known, then only two settings are necessary with the improved arrangement.

The conditions to be satisfied in our improved arrangement are therefore that $B - A = 0$, or $B = A$, and that $H = 0$. It is well known that, for such an arrangement, if any other pair of rectangular axes OP' and OQ' are selected in the plane POQ instead of the axes OP and OQ respectively, and if A'B' and H' denote the corresponding moments and products of inertia of the system relative to the new axes OP' OQ' OR' then it will also be true that $B' - A' = 0$ or $B' = A'$ and each of these equals $A$ (or $B$) and also that $H' = 0$.

In other words, for any line in the plane POQ, which in our case is the horizontal plane through the centre of gravity of the suspended system, the moment of inertia about this line is constant. Also it is constant, but not necessarily the same constant, about every line through OR in any plane parallel to the plane POQ. This geometrical or dynamical specification defines the necessary and sufficient condition for our arrangement.

In order to make the improved arrangement more understandable, we shall give some typical systems which satisfy the given condition, but it is understood that our invention is not restricted to these specific examples.

It may be noted that the conditions do not depend to any extent upon the relative vertical (parallel to OR) positions of the mass elements, but only upon their relative horizontal positions. Consequently, we shall specify only the projection of the system upon the horizontal plane through the centre of gravity, it being understood that the vertical displacement of any or all of the elements of the system relative to this horizonal plane is entirely arbitrary and at our disposal.

Figure 2:
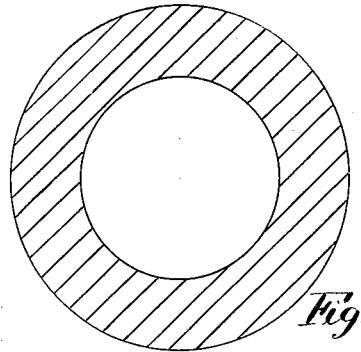
Fig. 2 shows a system of masses forming a uniform ring bounded by concentric circles.

The first system comprises as exemplified in Fig. 2, a system of masses forming a uniform ring, bounded by concentric circles having their centres at O. The radius of each circle is arbitrary, and in the limit, the smaller circle may reduce to the point O, so that the ring becomes a circular disc, or in another case the ring may become a single circle.

Figure 3:
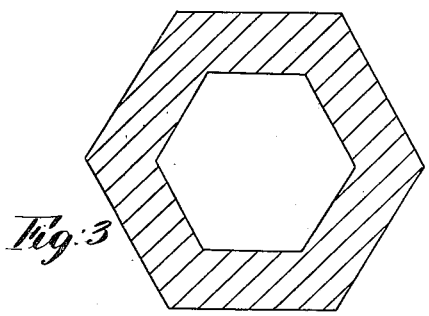
Fig. 3 shows a system of masses forming a uniform figure bounded by concentric, parallel, regular polygons of any number of sides, not less than three.

The second system comprises as shown in Fig. 3, a system of masses forming a uniform ring, bounded by concentric parallel, regular polygons of any number of sides not less than three. The centre of each polygon is at O. In the limits the inner polygon may reduce to the single point o or the ring may become a single line.

Figure 4:
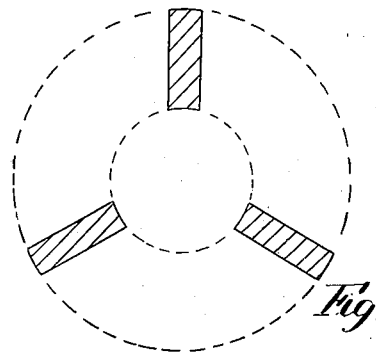
Fig. 4 shows a system of masses forming a series of equal, uniform, radial arms projecting from the circumference of an inner concentric circle.

The third system comprises as in Fig. 4, a system of masses forming a series of equal uniform radial arms, separated by equal angles, the arms all projecting from a circle centre o, and extending to a concentric circle, and, when produced passing through o. In the limit the arms may actually meet at o. The number of arms cannot be less than three.

Figure 5:
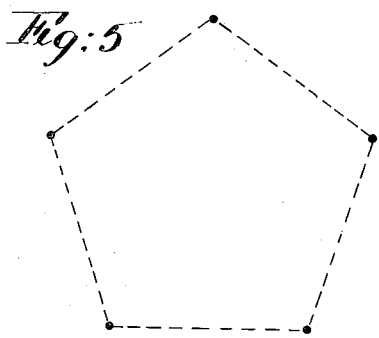
Fig. 5 shows a system of equal masses each concentrated at points symmetrically disposed at the vertices of a regular polygon.

The fourth system comprises as illustrated in Fig. 5, a system of equal masses concentrated at points symmetrically disposed one at each of the vertices of a regular polygon having its centre at o, the number of masses being not less than three.

Figure 6:
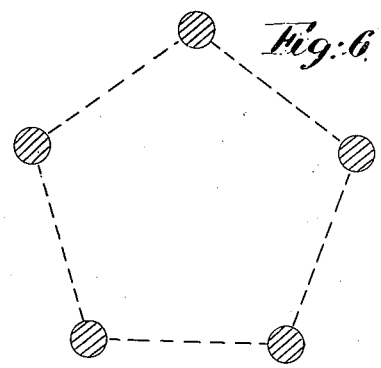
Fig. 6 shows a system of equal masses, each mass having its center of mass on the vertices of a regular polygon.

The fifth system comprises as shown in Fig. 6, a system of equal masses, not less than three, each mass having its centre of mass on the vertices of a regular polygon, centre o, as in the fourth system. The actual masses may be rings, cylinders, polygonal or circular discs, or any arrangement which, relative to their respective centres of mass, has the desired dynamical property of equality of moments of inertia about any horizontal line through the centre of mass.

A sixth system may comprise a system of masses consisting of any one or more of the preceding five systems, superposed upon or combined with any other or others of the aforesaid five systems.

Figure 7:
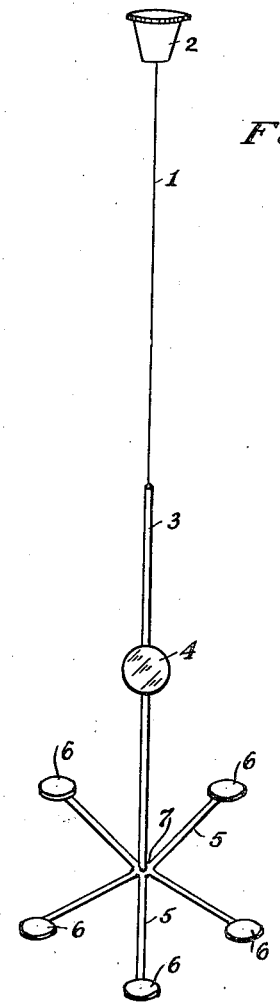
Fig. 7 illustrates a torsion balance showing the manner in which any of the suspended systems described in Figs. 1 to 6 inclusive would be arranged relative to the torsion suspension wire.

In Fig. 7, there is schematically in perspective shown a torsion balance showing the manner in which any of the suspended systems, described in Figs. 1–6 incl., would be arranged relative to the torsion suspension wire. In particular, there is shown a system of masses in the form of circular disks 6, arranged as shown in Fig. 6. That is to say, each mass or disk 6 has its centre of mass on one of the vertices of a regular polygon. The disks are, of course, in the same horizontal plane, and are maintained in rigid, symmetrical position relative to one another by five equal and symmetrically disposed radial arms, the latter holding the masses in their correct positions.

A supporting stem 3, which carries a mirror 4 to indicate its rotation, is affixed at its lower end 7, to the junction of the five radial arms 5. A thin, torsion wire 1 is affixed at one end to a torsion head 2, in the well known manner, and at its opposite end to the supporting stem 3.

It is understood, of course, that any of the systems described herein may be suspended from the torsion wire, in the manner shown herein, one such system only being shown for the sake of simplicity of showing, it being readily evident to those skilled in the art, how to suspend any of the other systems from the conventional torsion balance shown.

Figure 8:
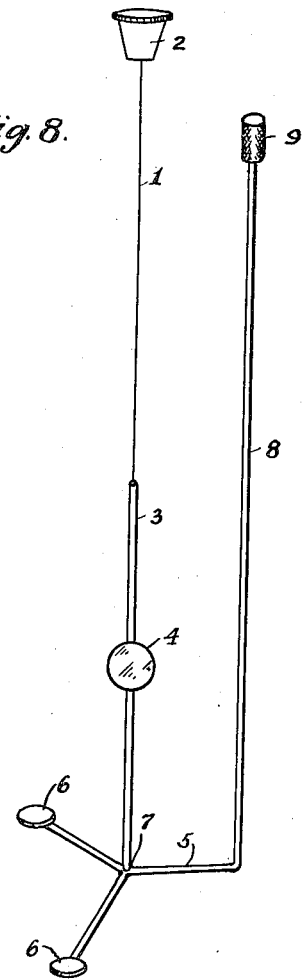
Fig. 8 is a modification of the view shown in Fig. 7.

The object of the modified orientation system shown in Fig. 8 is to enable the gravity gradients to be evaluated with fewer settings than has hitherto been possible and thereby to increase the rapidity of measurement.

In particular it is advantageous to employ two systems of the improved or of the customary type, oriented in mutually perpendicular directions but any other suitable arrangement may be employed.

The modification shown in perspective schematic view in Fig. 8 has the same torsion balance structure as that shown in Fig. 7. That is to say, a thin, torsion suspension wire 1 is suspended from a torsion head 2 at its upper end. The lower end of the wire 1 is affixed to an end of a supporting stem 3, the latter carrying a mirror 4 to indicate rotation.

The lower end of stem 3 is affixed, at 7, to the junction of a number of equally and symetrically disposed radial arms 5. In this case, three such arms are shown, although any number can be used, depending on the number of masses used in the horizontal plane of the suspended mass system.

At the free extremities of two of the arms 5 are disposed weights or masses 6, in this case in the form of circular disks. It is understood that these masses may be spheres or other shapes, as outlined heretofore. Again, these masses are rigidly affixed to the said arm extremities.

From the extremity of the third arm there rises a vertical support 8, the upper extremity of said support 8 having a weight 9 rigidly attached to it. The support 8 is preferably perpendicular to the arm 5, to which it is affixed. This construction permits the gravity gradients to be evaluated with fewer settings than hitherto possible.

Claims.

1. A torsion balance for measuring gravitational magnitudes comprising a suspended system of masses so arranged that its moment of inertia about a horizontal line passing through the vertical line which traverses its centre of gravity is constant for all such horizontal lines in any one horizontal plane.

2. A torsion balance for measuring gravitational magnitudes comprising a suspended system of masses so arranged that its moment of inertia about a horizontal line passing through the vertical line which traverses its centre of gravity is constant for all such horizontal lines in any one horizontal plane, in which all portions of the suspended mass system lie substantially in the same horizontal plane.

3. A torsion balance for measuring gravitational magnitudes comprising a suspended system of masses so arranged that its moment of inertia about a horizontal line passing through the vertical line which traverses its centre of gravity is constant for all such horizontal lines in any one horizontal plane, in which all portions of the suspended mass system lie substantially in the same horizontal plane, and in which the suspended mass system is symmetrical about a vertical plane passing through its center of gravity.

4. In a torsion balance for measuring gravitational magnitudes a suspended mass system including a plurality of masses so arranged that the difference between the moments of inertia of the suspended mass system about two coplanar orthogonal horizontal axes fixed in the system is small, and in which the moment of inertia of the said suspended mass system about a horizontal line passing through the vertical line which traverses its centre of gravity is constant for all such horizontal lines in any one horizontal plane, and in which the suspended mass system when projected upon a horizontal plane through its centre of gravity has the plurality of masses equidistant from each other and their common centre.

5. In a torsion balance for measuring gravitational magnitudes a suspended mass system so arranged that the difference between the moments of inertia of the suspended mass system about two coplanar orthogonal horizontal axes fixed in the system is negligibly small, and in which the moment of inertia of the said suspended mass system about a horizontal line passing through the vertical line which traverses its centre of gravity is constant for all such horizontal lines in any one horizontal plane, and in which the suspended mass system when projected upon a horizontal plane through its centre of gravity comprises a system of equal masses concentrated at points symmetrically disposed one at each of the vertices of a regular polygon, the number of masses being not less than three.

6. In a torsion balance for measuring gravitational magnitudes a suspended mass system so arranged that the difference between the moments of inertia of the suspended mass system about two coplanar orthogonal horizontal axes fixed in the system is negligibly small, and in which the moment of inertia of the said suspended mass system about a horizontal line passing through the vertical line which traverses its centre of gravity is constant for all such horizontal lines in any one horizontal plane, and in which the suspended mass system when projected upon a horizontal plane through its centre of gravity comprises a system of not less than three similar masses each mass having its centre of mass at one angle of a regular polygon.

7. In a torsion balance for measuring gravitational magnitudes a suspended mass system so arranged that the difference between the moments of inertia of the suspended mass system about two coplanar orthogonal horizontal axes fixed in the system is negligibly small, and in which the moment of inertia of the said suspended mass system about a horizontal line passing through the vertical line which traverses its centre of gravity is constant for all such horizontal lines in any one horizontal plane, and in which the suspended mass system when projected upon a horizontal plane through its centre of gravity comprises not less than three equal radial arms separated by equal angles, two of the masses being in the same horizontal plane.

In testimony whereof we have hereunto set our hands.

HERMAN SHAW.
ERNEST LANCASTER JONES.